United States Patent [19]
Erb

[11] Patent Number: 6,130,938
[45] Date of Patent: Oct. 10, 2000

[54] AUTOMATIC CALL FORWARDING

[75] Inventor: Paul Erb, Ottawa, Canada

[73] Assignee: Mitel Corporation, Kanata, Canada

[21] Appl. No.: 08/886,059

[22] Filed: Jun. 30, 1997

[30] Foreign Application Priority Data

Jul. 8, 1996 [CA] Canada ................................ 2180684

[51] Int. Cl.⁷ .................................................. H04M 3/42
[52] U.S. Cl. .......................... 379/211; 379/142; 379/201
[58] Field of Search .................................... 379/210, 211, 379/212, 201, 207, 219, 220, 221, 142

[56] References Cited

U.S. PATENT DOCUMENTS

| | | | |
|---|---|---|---|
| 5,487,111 | 1/1996 | Slusky | 379/211 |
| 5,706,339 | 1/1998 | Eisdorfer et al. | 379/211 |
| 5,724,411 | 3/1998 | Eisdorfer et al. | 379/211 |
| 5,742,674 | 4/1998 | Jain et al. | 379/207 |
| 5,896,448 | 4/1999 | Holt | 379/211 |
| 5,905,789 | 5/1999 | Will | 379/211 |
| 5,917,891 | 6/1999 | Will | 379/88.03 |

FOREIGN PATENT DOCUMENTS

96/07286  3/1996  WIPO .

*Primary Examiner*—Krista Zele
*Assistant Examiner*—Benny Q. Tieu
*Attorney, Agent, or Firm*—Marks & Clerk

[57] ABSTRACT

A method of forwarding calls, comprises storing a list of possible forwarding destinations for each subscriber, maintaining a behavior database for each subscriber indicating the probable location of the subscriber at any particular time, and forwarding incoming calls to the probable location determined from the behavior database. The behavior data base is dynamically updated according to the success rate of the forwarded calls.

17 Claims, 3 Drawing Sheets

| this | destination | next | hits | misses | hours | days |
|---|---|---|---|---|---|---|
| 0 | 8882422 | 1 | 0 | 0 | | |
| 1 | 829 | 2 | 346 | 123 | 9, 10, 11, 12, 14, 15, 16, 17 | 2, 3, 4, 5, 6 |
| 2 | 892 | 3 | 145 | 76 | 12, 13, 14, 15, 16 | 2, 3, 4, 5, 6 |
| 3 | 8881243 | 4 | 12 | 24 | 9, 10, 11, 12, 14, 15, 16, 17 | 3, 4, 5, |
| 4 | 8882143 | 0 | 7 | 16 | 13, 14, 15, 16, 17 | 4, 6 |
| | | | | | | |
| | | | | | | |

FIG. 5

AUTOMATIC CALL FORWARDING

This invention relates to the field of telephony and in particular to a method of automatically forwarding calls to another destination.

The purpose of call forwarding is to correctly present a call when the user is not available at his primary extension (subscriber number). Traditionally the call has been presented to an answering service, such as a secretary, attendant or voicemail system. With technological advances there are a growing number of alternative devices at which the callee can be presented a call. These include wireless handset, cellular phone, pager, and alternate phone devices. In many cases the user would like these destinations attempted prior to redirecting the call to an answering service. The alternatives available make it difficult for a user to anticipate and forward his primary extension appropriately. An unobtrusive mechanism is required to perform this forwarding without user intervention.

The call forwarding feature typically requires that the user set the forwarding destination whenever they are not available to receive calls. A great deal of flexibility is permitted in how to program the call forwarding. The provision of a schedule from which call forwarding is determined based on time of day has been proposed. The value of the schedule relies upon the user closely following or consistently modifying the schedule to reflect their movements.

An object of the present invention is to permit the system to follow the user's changing habits without requiring the user to continually update the system manually.

According to the present invention there is provided a method of forwarding telephone calls, comprising storing a linked list of possible forwarding destinations for each subscriber, maintaining a behaviour database for each subscriber based on a success rate at reaching the subscriber at each destination, determining from said behaviour database for a called subscriber a target destination where the called subscriber is probably located, forwarding incoming calls for the called subscriber to said target destination, and dynamically updating said behaviour database according to the success rate of the forwarded calls.

The invention requires no action on behalf of the user to establish call forwarding. The user may provide a list of possible destinations at which he may be reached or the system can compile a list from call the user's general call forwarding activity.

In one embodiment, the invention applies opportunistic reasoning methods to determine the call destination and permits the caller to be informed of each attempt to reach the user at different destinations. The invention also permits the caller to override attempts to reach the answering service directly. The risk of call forward chaining is eliminated by determining the destination only in relation to the original destination.

The invention also provides a system for forwarding telephone calls, comprising a memory for storing destination information for calls to be forwarded, said destination information including the destination number and success rate data therefor; and a central processing unit for routing calls to a probable location of the user determined from said destination information, said central processing unit monitoring the success rate for forwarded calls and dynamically updating said success rate data.

The success rate data may be stored with time data and can include, for example, the time of day and day of the week. The time day can be divided into predetermined time slots, for example hourly periods.

The invention will now be described in more detail, by way of example only, with reference to the accompanying drawings, in which:

FIG. 5 is an example updated destination list table showing behaviour records.

Figure 1:
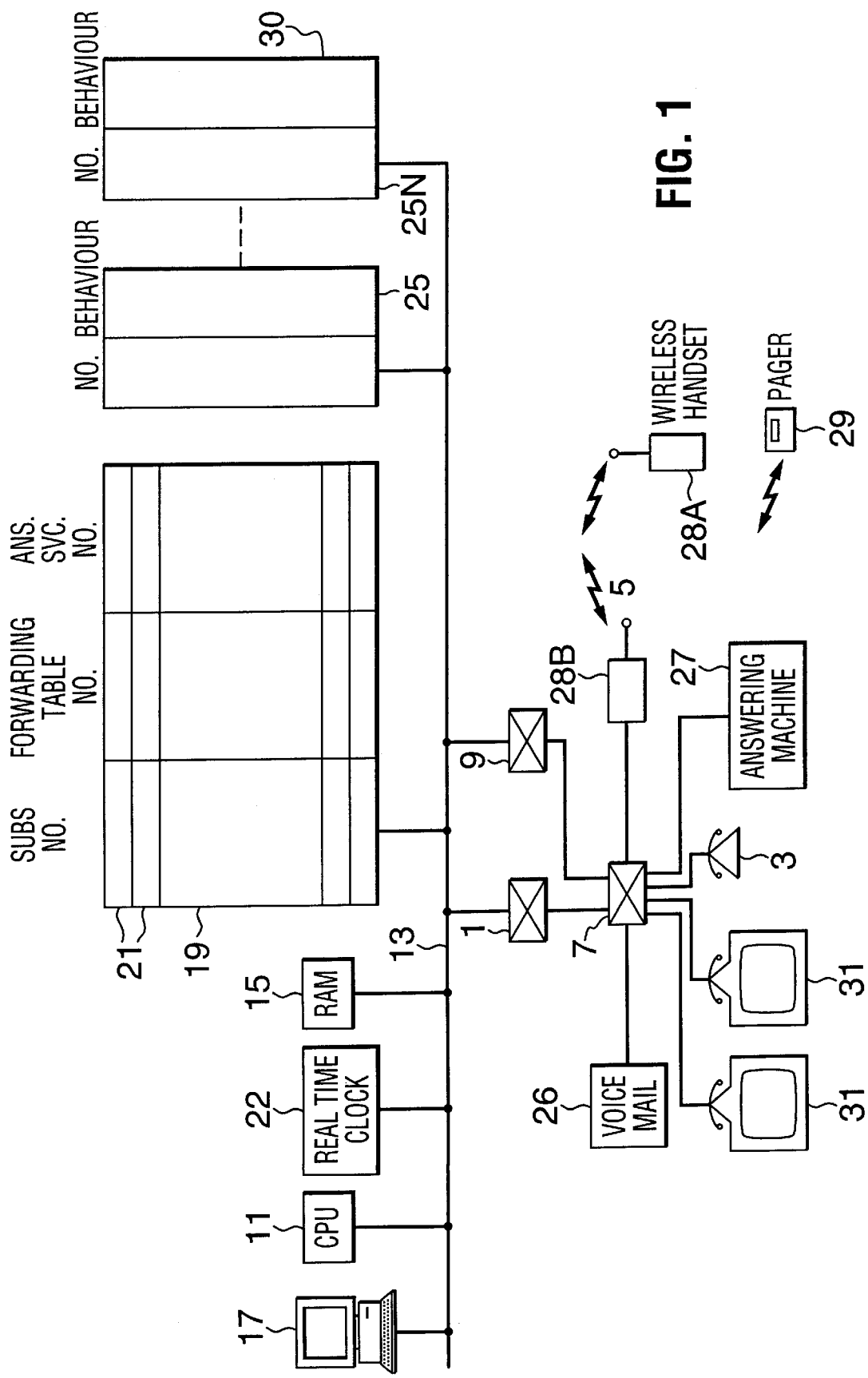
FIG. 1 is a block diagram of a telephone system in accordance with the invention.

Referring FIG. 1, the basic PABX system on which the invention is potentially implemented is of the type sold by Mitel Corporation as type SX2000, and as described in U.S. Pat. No. 4,615,028 issued Sep. 30, 1986 and U.S. Pat. No. 4,616,360 issued Oct. 7, 1986 and assigned to Mitel Corporation. Basically this system comprises a circuit switch 1 for switching calls between lines to telephones 3 and trunks 5 which terminate at line and trunk circuits (not shown) and which are routed to the circuit switch via a peripheral switch 7. Control message signals are switched to the peripheral switch via a message switch 9. Messages are passed between the message switch and a central processing unit (CPU) 11, and between the circuit switch and the CPU via bus 13. Programs for operating the CPU, and data stored during its operation are stored in random access memory (RAM) 15.

When a subscriber wishes to transfer a call, he goes offhook and dials a call transfer code (or depresses a button designating the same), followed by the number to which calls to his subscriber's line number are to be transferred. The call transfer code is received by the CPU 11, which stores the following new number in the RAM 15 in a feature table normally looked up by the CPU whenever a call to a subscriber line terminated on the PABX is received. From then on, all calls to that subscriber line are routed to the line number entered by the subscriber.

In the SX2000 system, there is the facility of routing all incoming calls to the PABX to ring a particular single number or group of numbers during night hours, i.e. an automatic night line facility. This requires that a PABX attendant, operating an attendant station 17 connected to the night line facility via the station 17 when the PABX is first installed and programmed.

The system shown in FIG. 1 additionally includes a correlation table 19 stored in a memory connected to the bus 13 which is accessible by the CPU 11. The correlation table maintains a correlation of subscriber line numbers 21 against pointers 23 to a forwarding table 25-25N (e.g. forwarding table numbers 5000-509N)

Forwarding tables 25-25N to which the pointers 23 point are stored in a memory connected to the bus 13 which is accessible by the CPU. The forwarding tables maintain a list subscriber numbers to which calls are to be transferred and behaviour records which will be described in more detail below. Each table is shown in FIG. 1 with a table number corresponding to a subscriber PABX local number, e.g. table 5000, table 509N, etc.

A real time clock 22 is also accessible by the CPU, and is shown connected to the bus 13.

The system may also have various devices to which calls may be routed, each having a number to which calls may be transferred, e.g. voice mail 26, call answering machines 27, wireless handsets 28A in communication with line circuits 28B, pagers 29, wireless personal digital assistants, wireless personal communication devices, etc.

The subscribers who have the class of service granting the automatic forwarding facility preferably have telephones with displays 31 (referred to herein as display phones 31) connected to their subscriber lines. It should be noted it is intended that telephones as used in this specification means any form of device which can include voice communication, and can be for instance telephones with liquid crystal displays, video telephones, computers with handset adjuncts, facsimile machines with handset adjuncts and with displays, etc. In addition, while connection of these telephones to the telephone switching system is described herein as being via subscriber lines, this invention is not limited thereto, and is intended to include connection via broad spectra media, such as a local area network, coaxial cable, wireless link, etc.

When the automatic call forwarding class of service is allocated to a subscriber, the attendant or the CPU 11 enters the subecriber's line number into table 19. This may be done from an attendant's terminal 17, or from a telephone designated to be the equivalent. It is known to allocate classes of service to individual subscriber lines in a telephone system from a telephone set designated to be the equivalent of an attendant's console, as has been done in the system known as Entrepreneur, sold by Mitel Corporation since the early 1980's.

The CPU then establishes a forwarding table 25 for that subscriber number and enters a pointer to that forwarding table against the subscriber number in table 19. The forwarding table 25 is in the form of a linked list, so that if the subscriber is not present at the most likely destination, the next destination is tried and so on.

The tables 25-25N contain a behaviour record 30 indicating the success rate for each attempt at call forwarding. This can be determined simply from whether the call extension is answered. Preferably, the called extension includes a call display feature for displaying the name of the called party so that if he is not present, others know not to pick up the telephone. Alternatively, the CPU 11 can respond to a confirmation signal that the called extension has been answered by the desired party. The confirmation signal can take the form of a DTMF digit, for example the party picking up the telephone could dial a "1" if he is the correct party.

A particular example of the invention will now be considered. The example is of a nuclear power company executive, Smithers, calling an employee, Homer Simpson, for a critical safety report. The user is Homer Simpson and the caller is Smithers.

The time is 2:00 in the afternoon on a Wednesday. Homer is just leaving work and sets up call forwarding to The Donut Stop where he and some coworkers intend to conduct afternoon discussions.

Each user, identified by his subscriber number, has an associated list of potential destinations in table 25-892N. This list is dynamically maintained by the CPU 11. Ordering of the destination list is arbitrary but should minimize performance impact. An additional destination is associated with each subscriber number to designate the user's answering service (e.g. voice mail, attendant, email, etc.).

Homer Simpson is extension 892. The corporate directory (table 19) contains this information and a link to the destination list (table 25-25N). His list of possible destinations is:

| | |
|---|---|
| 892 | Safety Station |
| 829 | The lunch room |
| 888–1243 | Moe's Tavern |
| 888–2143 | Home |

Figures 2, 3, 4:
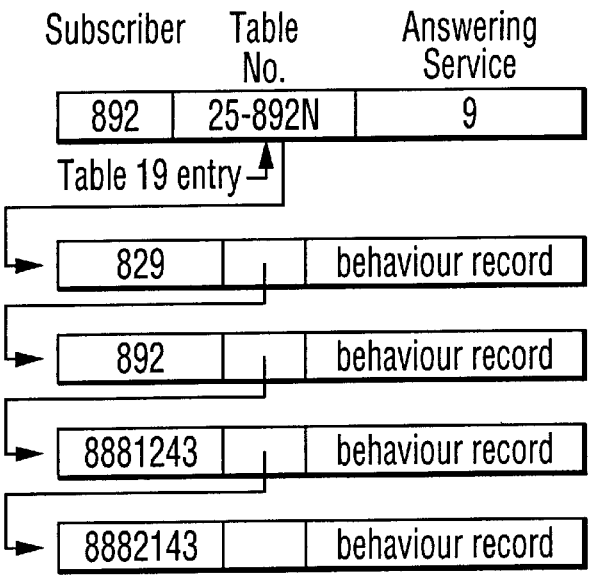
FIG. 2 is an example of a corporate directory entry for a particular subscriber.
FIG. 3 is an example of a destination list table for a particular subscriber.
FIG. 4 is an example destination list table showing behaviour records associated with different destination numbers.

The answering service for the company is provided by an attendant at extension 9 as shown by the last entry in FIG. 2, which shows the corporate directory entry for Homer Simpson linked to his destination list.

Within the table 19 the system stores the destination list identity and the answering service extension with the corporate directory entry for Homer Simpson.

The destination list identity is a number which uniquely identifies the associated list of potential destinations that stored within table 25-25N as a linked list. Each record is linked to another by a pointer (second field in FIG. 3).

Each destination in the destination list has an associated behaviour record. Behaviour information is maintained by the system for use in determining the best guess destination.

The first entry in the destination list of FIG. 4 is the behaviour record for each possible destination is maintained with each associated destination list entry. The example uses hits, misses, time of day, and day of week. In the case of time of day and day of week, a list of the hours (or days) at which calls are successfully delivered is stored. In the example a 24hr clock and a numeric week day (Sunday=1, Monday=2, etc.) is used for simplicity.

The first entry in the destination list of FIG. 4, shows the behaviour record for the most likely destination at which to reach Homer Simpson. He has been reached at extension 829, the lunch room, 346 times and during any working hour with the exception of between 1 and 2 pm (13).

Initially, the destination list can be provided by the user (as a series of destination numbers). Alternatively, the system can derive the destination list from the user's call forwarding activity. Each time the user forwards their extension to an alternate destination, the system appends the destination number to the destination list. The call forward destination is identified as the last reached destination to ensure it is attempted first when a new call is received (as described below). The system can also provide the user with the option of removing destinations from the destination list.

In the example, Homer Simpson sets up a new call forwarding destination. He is unaware of the new service provided by the system. As he sets up call forwarding to 888-3422, the Donut Stop, a new entry is added to the destination list by the system. Because the call forwarding is to take effect immediately the new destination is placed at the top of the destination list as the most probable destination. The behaviour record is initialized to nil values and inserted in the destination list table 25-892N as shown in FIG. 5.

Upon receiving an incoming call for the user, the system consults the destination list prior to presenting the call. The system applies opportunistic reasoning techniques to determine the best guess destination.

Homer leaves the building and is getting into his car when Smithers, in a panic, calls Homer's extension, 892. The system refers to the corporate directory entry for 892 and follows the link to the associated destination list. The system's destination determination method is applied.

Opportunistic reasoning techniques determine the best guess based on a derived model of behaviour rather than based on fixed expectations. The derived model can be obtained by any of a number of techniques. Some examples of opportunistic reasoning techniques include:

- a computer process which observes patterns in behaviour and attempts to predict the outcome based on previous observations under similar conditions (machine learning);
- a computer process which uses sample data to develop a model of the expected behaviour and iteratively refines the model based on further tests and observations (neural networks); and
- a computer process which uses measurable quantities in a fixed model to determine the expected outcome (parametric modelling).

Combinations of techniques and methods can be applied to arrive at the most performance effective process to determine the best guess for individual installations and users.

The model applied to determine the best guess can make use of a variety of behaviour information. In the example implementation these include: the last destination at which the user was reached (first in list), frequency that the user is found at a destination (hits), frequency that the user is not found at a destination (misses) time that the user has been found at a destination (time of day) weekday that the user has been found at a destination (day of week)

The first destination in the list is attempted first, i.e. 888-1243 (the Donut Stop). Subsequent guesses are based on time and day and then based on the hit to miss ratio.

The call is then presented to the best guess destination for a configured duration (i.e 3 rings). Should the call not be answered, the system again applies opportunistic reasoning techniques to determine the next best guess destination to attempt. This is repeated a configured number of times before the call is delivered to the user's answering service. The destination device is provided with an indication of both the caller and the callee to which the call is being placed by any available mechanism (e.g. set display, distinctive ringing, etc.

The call is presented to the Donut Shop and rings four times before the configured time of 5 seconds expires. No indication of caller or callee is available on the ringing phone. As the shop is busy the call is not answered. An exception message is returned and the system's destination determination method is applied again.

The next best guess is 829, the lunch room. The call rings and displays Homer Simpson's name on the single line display set. Those present in the lunch room refrain from answering the call. Again, an exception results and the system's destination determination method is applied.

Because the recorded behaviour for Moe's Tavern indicates Homer has never been found there in the afternoon on a Wednesday, this destination is not considered. The same applies to Home. Thus, the only guess remaining is Homer's safety station.

After an equally unsuccessful final attempt to reach Homer the system redirects the call to the answering service, at extension 9.

The caller is provided with progress information based on the destination being attempted (e.g. pager, cellular, etc.) or based on the position of the destination in the list (e.g. first, second, last etc.). Progress information is presented to the caller using any available mechanism (e.g. broken ring cycle, prerecorded message, text display, etc.).

During the above attempts to reach Homer, Smithers sees each call attempt on his luxury phone set. The display shows "Unknown External" while the call is presented to the Donut Shop (the shop just opened and has not been added to the corporate directory yet). For the lunch room the display shows "Food Sciences Division". For the safety station the display is "Nuclear Safety Station—Homer Simpson On-Duty". Finally, the display shows "Operator" when the answering service is reached.

When the call is answered, the behaviour record is updated for that destination. An additional extension to the system is to require a confirmation code that the call has reached the user (via any available mechanism e.g. press "1", say "one", etc.). Should the confirmation not be provided the call will resume attempts to reach the user and the behaviour record is not updated. An indication of which behaviours are most applicable can be maintained on a per user basis as well (either as defined by the user or as derived by statistical methods).

Knowing the new service provided by the system, Smithers decides to try again by dialing Homer's subscriber number, 892. As Homer was not reached by the previous attempts, the miss counter for each destination tried is incremented. Conditions may have changed sufficiently to change the destinations tried (i.e. time of day changed to make Moe's Tavern a possibility).

The call is presented to the Donut Shop again and is this time answered by an idle waitress. The switch applies an interactive voice response system to indicate that this is a call for Homer Simpson, please press 1 to receive the call. The message is repeated while the waitress inquires as to the presence of a Mr. Simpson at the donut shop.

By this time Homer has arrived at the donut shop. Expecting a call from a coworker, Homer accepts the call and presses 1. Smithers is connected with Homer and can now make his request.

The system updates the behaviour record for 888-1243, the donut shop, to indicate 1 hit at 14:00 on day 4. The order of the linked destination list is not changed because this destination was already first.

The caller can be immediately provided with the option, where a mechanism is available to override the call forwarding feature and be presented to the user's answering service instead. For example, the caller can be invited to dial a certain digit if he wishes to be put straight through directly to the user's answering service, which could of course be voice mail. This also facilitates message sending without disturbing the user (independent of the forwarding feature). The invocation of a "Do Not Disturb" feature by the callee can automatically force this behaviour.

Had Smithers not wanted to wait during the first series of attempts, pressing the answering service prompt would have connected him with the operator to leave Homer a message.

Priorities can be applied to the caller and the call destinations to permit more appropriate handling of call delivery. For example, if the callee has provided his home number for emergency use only, the call attempt to home should not be placed unless the caller has sufficient priority to make the emergency call. Additional opportunistic reasoning techniques can also be applied to improve the success rate of determining the best guess (e.g. trend analysis, etc.).

Although specifically applied to the call forwarding feature, this invention is also adaptable to other resource determination features. For example, the invention can be applied to a system where shared resources are distributed and it is important to obtain the closest available resource.

I claim:

1. A method of forwarding telephone calls, comprising storing a linked list of possible forwarding destinations for each subscriber, maintaining a behaviour database for each subscriber based on a success rate at reaching the subscriber at each destination, determining from said behaviour database for a called subscriber a target destination where the called subscriber is probably located, forwarding incoming calls for the called subscriber to said target destination, and dynamically updating said behaviour database according to the success rate of the forwarded calls.

2. A method as claimed in claim 1, wherein said behaviour database maintains a list of hits and misses for each destination at particular times and days of the week, and an incoming call is forwarded to the target destination for the called subscriber determined by analyzing said hits and misses to create a behaviour model for the called subscriber.

3. A method as claimed in claim 1, wherein a subscriber initially enters a destination list in said database, and said destination list is dynamically updated according to the success rate of the forwarded calls.

4. A method as claimed in claim 1, wherein each time a subscriber enters a call forwarding instruction, a destination number is added to a destination database, which is then dynamically updated on an on-going basis.

5. A method as claimed in claim 1, wherein said success rate is monitored in response to a subscriber-entered a code confirming an incoming call has actually been received by the called subscriber.

6. A method as claimed in claim 1, wherein the called subscriber's identity is extracted from a database and sent with the forwarded call for display on the at the forwarding destination.

7. A system for forwarding telephone calls, comprising a memory for storing destination information for calls to be forwarded, said destination information including a destination number and success rate data therefor; and a central processing unit for routing calls to a probable location of a called subscriber determined from said destination information, said central processing unit monitoring a success rate for forwarded calls and dynamically updating said success rate data.

8. A system as claimed in claim 7, wherein said memory also stores time data associated with said success rate data.

9. A system as claimed in claim 7, further comprising an input device for permitting subscriber entry of call destinations in said memory.

10. A system as claimed in claim 8, wherein said probable location is determined by analyzing said success rate data for the time of a call.

11. A system as claimed in claim 8, wherein said database stores the number of hits and misses for each destination in predetermined time periods, and said central processing unit calculates the best guess for a probable location of the called subscriber therefrom using a behaviour model.

12. A system as claimed in claim 7, wherein said central processing unit predicts the probable location from observed patterns in behaviour based on previous observations under similar conditions.

13. A system as claimed in claim 7, wherein said central processing unit uses sample data to develop a model of the expected behaviour and iteratively refines the model based on further observations.

14. A system as claimed in claim 7, wherein said central processing unit is responsive to an entered digit to determine whether a forwarded call has reached the called subscriber.

15. A system as claimed in claim 7, wherein said time data includes the time of day and day of the week.

16. A system as claimed in claim 7, wherein said central processor extracts the user's name from said database and forwards it for display at the forwarding destination.

17. A system as claimed in claim 7, which is implemented in associated with a PABX.

* * * * *